(12) United States Patent
Malaure et al.

(10) Patent No.: US 6,446,262 B1
(45) Date of Patent: Sep. 3, 2002

(54) BROADCASTING INTERACTIVE APPLICATIONS

(75) Inventors: Jason Robert Malaure; Richard Andrew Kydd, both of Middlesex; Simon Anthony Vivian Cornwell; Matthew Edward Tims, both of London, all of (GB)

(73) Assignee: Two Way TV Limited, London (GB)

( * ) Notice: Subject to any disclaimer, the term of this patent is extended or adjusted under 35 U.S.C. 154(b) by 0 days.

(21) Appl. No.: 09/419,332

(22) Filed: Oct. 15, 1999

(30) Foreign Application Priority Data

Oct. 26, 1998 (EP) ............................................. 98308728

(51) Int. Cl.[7] ........................... H04N 7/16; H04N 5/445
(52) U.S. Cl. ......................... 725/141; 725/58; 725/87; 725/133; 725/153
(58) Field of Search ......................... 348/7, 9, 12, 13, 348/906, 468, 473, 564; 345/327, 716, 723; 463/40, 42; 725/135, 136, 137, 138, 139, 140, 141, 142, 87, 58; 455/3.1, 4.2, 5.1

(56) References Cited

U.S. PATENT DOCUMENTS

| | | | | |
|---|---|---|---|---|
| 4,573,072 A | * | 2/1986 | Freeman | ...................... 358/86 |
| 5,343,239 A | * | 8/1994 | Lappington et al. | ........... 348/12 |
| 5,355,162 A | * | 10/1994 | Yazolino et al. | ............. 725/131 |
| 5,526,035 A | * | 6/1996 | Lappington et al. | ........... 348/13 |
| 5,734,589 A | * | 3/1998 | Kostreski et al. | ........ 364/514 A |
| 5,768,539 A | * | 6/1998 | Metz et al. | ............. 395/200.79 |
| 5,936,661 A | * | 8/1999 | Trew | ............................ 348/13 |
| 6,014,184 A | * | 1/2000 | Knee et al. | .................. 348/731 |
| 6,289,510 B1 | * | 9/2001 | Nakajima | ..................... 717/11 |

FOREIGN PATENT DOCUMENTS

| | | |
|---|---|---|
| EP | 833511 | 4/1998 |
| WO | 9634486 | 10/1996 |
| WO | 9641478 | 12/1996 |

* cited by examiner

Primary Examiner—Andrew Faile
Assistant Examiner—Krista Bui
(74) Attorney, Agent, or Firm—Price and Gess

(57) ABSTRACT

A method and apparatus for broadcasting a scheduled interactive application to a plurality of users via respective user interfaces. Initially, setup data is placed on a broadcast carousel prior to a scheduled start time of the interactive application whereby setup data is repeatedly broadcast to the user interfaces. A status flag is broadcast to the user interfaces to indicate that the setup data has been placed on the broadcast carousel. Real time data is broadcast to the user interfaces at the scheduled start time. Electronic programme guide (EPG) data indicating a scheduled start time for the scheduled interactive application is further broadcast to the user interfaces.

16 Claims, 4 Drawing Sheets

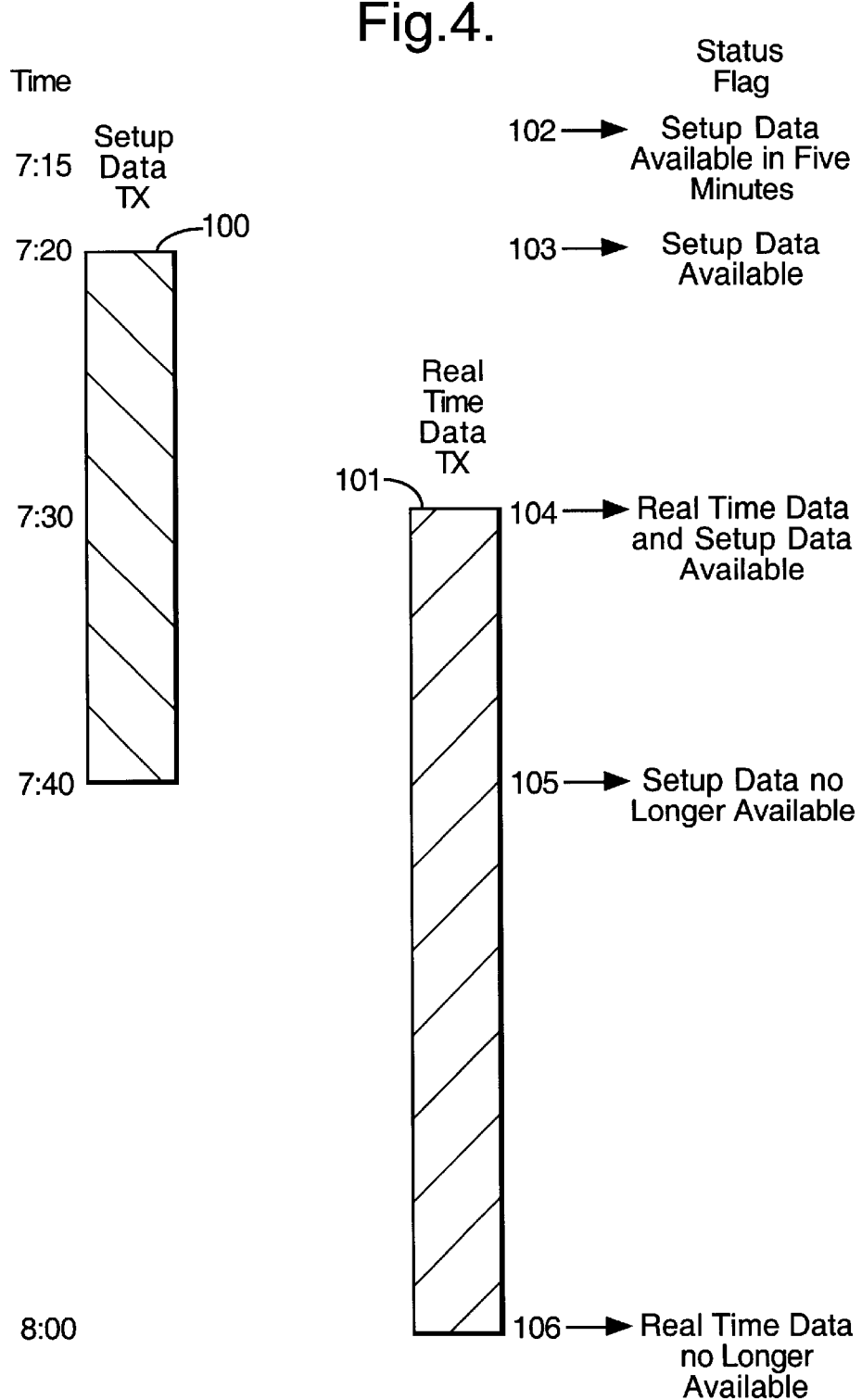

BROADCASTING INTERACTIVE APPLICATIONS

BACKGROUND OF THE INVENTION

The present invention relates to a method and apparatus for broadcasting a scheduled interactive application to a plurality of users via respective user interfaces.

Field of the Invention

In conventional interactive broadcast systems, scheduled interactive applications may be provided in which real time data is broadcast to user interfaces from a scheduled start time onwards. The users may be informed of the scheduled start time by an electronic programme guide (EPG). Alternatively the scheduled start time may be advertised in a TV guide magazine.

It is often necessary for the user interfaces to download set up data prior to the scheduled start time. For instance it may be necessary for the user interfaces to run an executable computer program in order to take part in the application. The application may also require the user interfaces to display video clips or bitmaps, or play back sound samples during the application and it may not be possible to download this data in real time during the application. Therefore setup data (eg executable program files, bitmaps, sound samples, video clips, and other multimedia and data resources) is placed on a broadcast carousel prior to the scheduled start time whereby the setup data is repeatedly broadcast to the user interfaces.

If a user wishes to take part in the scheduled interactive application then they download the setup data onto their user interface. The user interface is then ready to take part in the scheduled interactive application by downloading the real time data as it is broadcast from the scheduled start time onwards.

BRIEF SUMMARY OF THE INVENTION

In accordance with a first aspect of the present invention there is provided a method of broadcasting a scheduled interactive application to a plurality of users via respective user interfaces, the method comprising:

a) placing setup data on a broadcast carousel prior to a scheduled start time whereby the setup data is repeatedly broadcast to the user interfaces; and b) broadcasting real time data to the user interfaces at the scheduled start time, wherein the method further comprises:

c) broadcasting a status flag to the user interfaces, the status flag being indicative of the status of the setup data broadcast carried out in step a) or the real time data broadcast carried out in step b).

In accordance with a second aspect of the present invention, there is provided apparatus for broadcasting a scheduled interactive application to a plurality of users via respective user interfaces, the apparatus comprising:

a) means for placing setup data on a broadcast carousel prior to a scheduled start time whereby the setup data is repeatedly broadcast to the user interfaces; and b) means for broadcasting real time data to the user interfaces at the scheduled start time, wherein the apparatus further comprises:

c) means for broadcasting a status flag to the user interfaces, the status flag being indicative of the status of the setup data broadcast means or the real time data broadcast means.

On or after receipt of the status flag, the user interfaces can provide their respective user with a status notification, even if the user interface is not presently receiving data from the broadcast carousel.

The status flag may provide a wide variety of status information relating to the broadcasts. For instance the status flag may be indicative of the start or stop times of the broadcasts. The status flag may indicate the start/stop times directly by being broadcast at the start/stop times. Thus when the user interfaces receive the status flag they know that one of the broadcasts has started or finished. Alternatively the status flag may indicate the start stop times indirectly by carrying information relating to the start/stop times—for instance the status flag may carry the message "real time data broadcast will start at 7:30 " or "setup data broadcast will start in five minutes" etc.

The scheduled start time of the real time broadcast may be advertised in a TV guide magazine. However preferably the method further comprises broadcasting electronic programme guide (EPG) data to the user interfaces, the EPG data being indicative of the scheduled start time of the real time data broadcast.

The user can be provided with a status notification in a number of ways—including a highlight (eg. a colour highlight), flag or icon against an EPG programme listing; a pop-up icon; an on-screen strap; or an audio message.

The setup data, status flag and real time data may be broadcast to the user interfaces over a variety of transmission media, including the vertical blanking interval (VBI) of a normal TV signal or on a separate radio FM-SCA channel or other data format such as a cable modem. Other forms of transmission including satellite and the internet may also be used.

The setup data and real time data typically originates at a central computer system (CCS). The user interfaces will typically be remote not only from the CCS but also from each other.

The status flag and setup data may be time-multiplexed on a common broadcast frequency. However preferably the status flag and setup data are broadcast at different broadcast frequencies. This has the advantage that if a user interface is not tuned to the same frequency as the setup data frequency, it can still receive the status flag.

Similarly the status flag and EPG data may be broadcast at different broadcast frequencies. However preferably the status flag is broadcast at the same broadcast frequency as the EPG data. This has the advantage that a user interface tuned to receive the EPG data does not need to switch frequencies to receive the status flag.

The status flag may be sent only once, or may be repeatedly broadcast (and time-multiplexed with the EPG data in the case where a common frequency is used).

The scheduled interactive application may take a variety of different forms—for instance it may comprise a video game which is played simultaneously by a number of remote users, or, a quiz game played simultaneously by a number of remote users. Alternatively the application may be broadcast in conjunction with a live TV event. For instance the application may enable the user to take part in a live TV quiz, or predict the occurrence of certain events in a live sporting event.

BRIEF DESCRIPTION OF THE DRAWINGS

An example of the present invention will now be described with reference to the accompanying drawings, in which:

FIG. 4 illustrates the timing of the broadcasts.

DETAILED DESCRIPTION OF THE INVENTION

Figure 1:
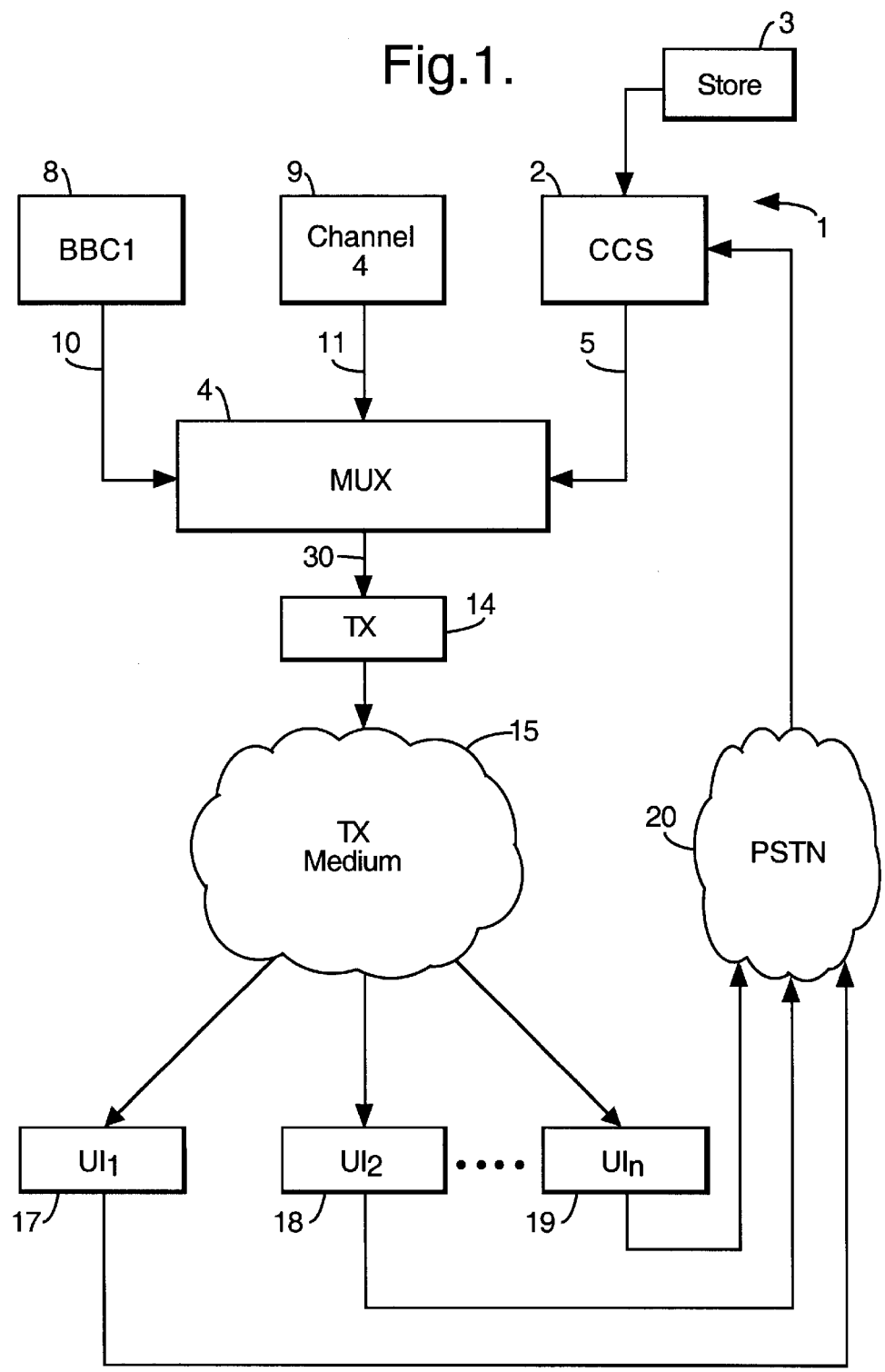
FIG. 1 is a block diagram of a digital broadcast network.

The digital broadcast network shown in FIG. 1 comprises an interactive game control system 1 including a central computer system (CCS) 2 and an application data store 3. The application data store 3 contains setup data and real time data which can be accessed and amended by the central computer system 2. The setup data may comprise executable program files, bitmaps, sound samples, video clips, and other multimedia and data resources. The real time data comprises data which is broadcast after the scheduled start time (eg question/answer data for a quiz game application). The setup data and real time data is fed at an appropriate time to a broadcast headend multiplexer 4 via a data feed 5. The CCS also generates electronic programme guide (EPG) data which is fed to an EPG multiplexer 6 via EPG data feed 7. Each item of EPG data includes a programme identifier (PID) and a system information (SI) table containing EPG information relating to that PID (eg. name, scheduled start time, splash screen data etc).

Broadcast TV stations 8 (BBC1) and 9 (Channel 4) each generate digital audio and video signals which are fed to the broadcast headend multiplexer 4 via respective data feeds 10,11. The data feeds 5,10,11 may be via dedicated cables or via broadcast on the air.

The broadcast TV stations 8,9 also generate EPG data which is fed to the EPG multiplexer 6 via respective data feeds 12,13. Each item of EPG data includes a programme identifier (PID) and a system information (SI) table containing EPG information relating to that PID (eg. name, scheduled start time and broadcast TV station name).

The broadcast headend multiplexer 4 multiplexes the digital data from the data feeds 5,10,11 and outputs the data serially to a transmitter 14 as an MPEG-II transport stream 30. The transmitter 14 modulates the data at X hz prior to transmission over a transmission medium 15. Similarly the EPG multiplexes the digital data from the EPG data feeds 7,12,13 and outputs the data serially to a transmitter 16 as an MPEG-II transport stream 31. The transmitter 16 modulates the data at Y hz prior to transmission over the transmission medium 15.

A number of user interfaces (UIs) 17,18,19 etc. receive data from the transmission medium 15. The UIs can also send data to the. CCS 2 via the public-switched-telephone-network (PSTN) 20.

Figure 2:
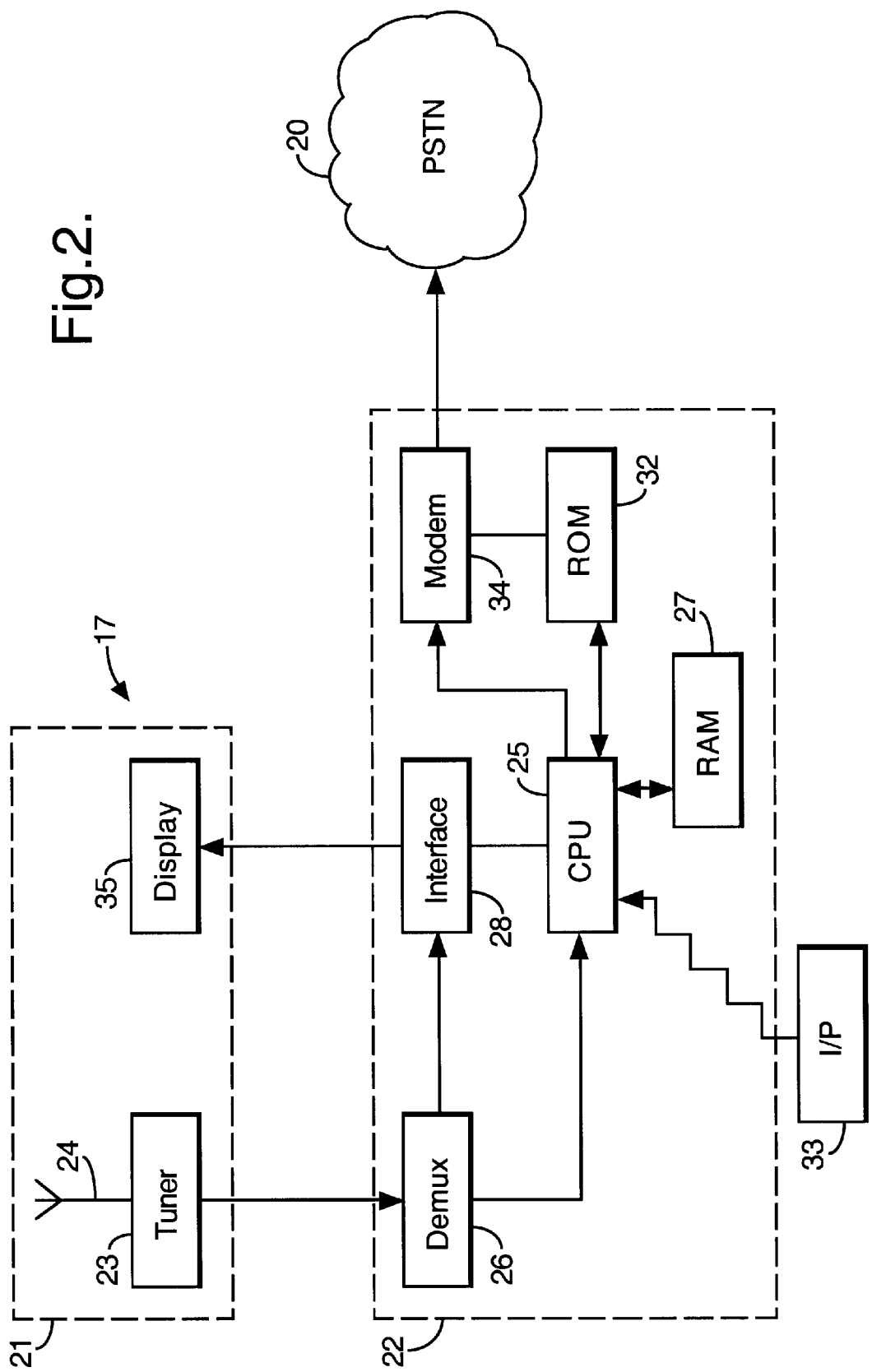
FIG. 2 is a block diagram of a user interface.

One of the user interfaces 17 is shown in detail in FIG. 2. The UI comprises a conventional television set 21, a set-top box 22 and an input device 33. The television set 21 comprises a cathode ray tube (CRT) 35 and a tuner 23 coupled to an aerial 24. The tuner 23 is selectively tuned by a central processing unit (CPU) 25 to receive data from the transmission medium 15 on either frequency X or frequency Y. Data is passed to a demultiplexer 26 which demultiplexes the MPEG-II transport stream in accordance with the conventional MPEG-II format. Setup data and real time data is fed to the CPU 25 and video/audio data is fed to a display interface 28.

The CPU 25 accesses a random access memory (RAM) 27 and a read only memory (ROM) 32 to compile a display signal which is passed to the display interface 28 and merged with the audio/video signal from the demultiplexer 26. The input device 33 provides input to the CPU 25 from a user. Return path data is returned to the CCS 2 by the CPU 25 via a modem 34 and the PSTN 20.

Figure 3:
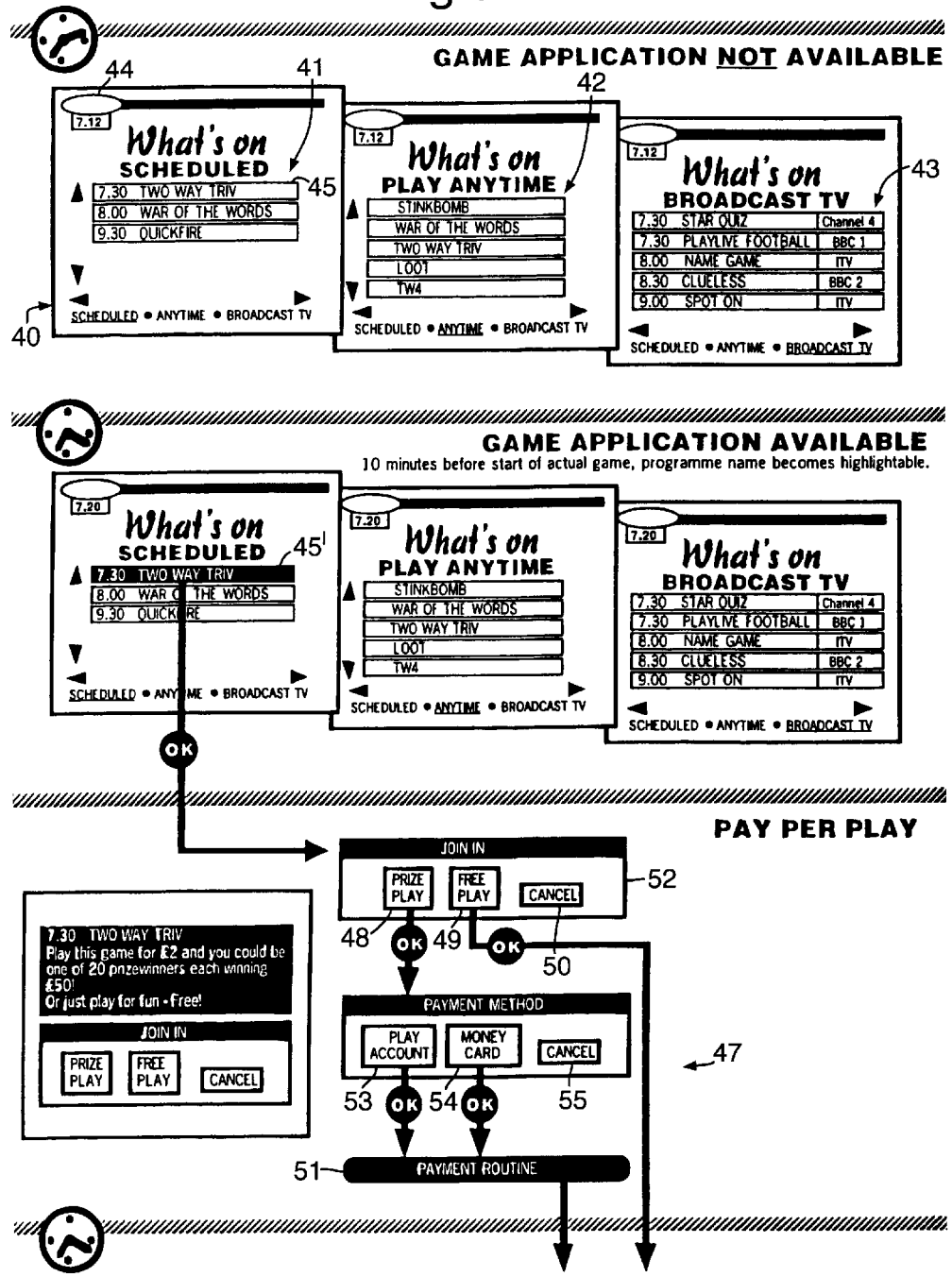
FIG. 3 shows a number of EPG screens and a splash screen.

An example of an interactive service will now be described with reference to FIG. 3 which is a flow is diagram including a sequence of images which are presented to the user on the CRT 35 when the tuner 23 is tuned to receive data from the EPG transport stream 31.

By highlighting one of three selections 40, the user is either presented with a list 41 of scheduled programmes, a list 42 of play anytime programmes or a list 43 of broadcast TV programmes. The scheduled programmes include a programme entitled "Two Way Triv" scheduled at a start time of 7:30, "War of the Words" scheduled at a start time of 8:00, and "Quick Fire" scheduled at a start time of 9:30. The list 42 of play anytime programmes gives a number of interactive games ("Stinkbomb", "War of the Words" etc.) which can be played at any desired time. The list 43 of broadcast TV programmes include a programme entitled "Star Quiz" scheduled at a start time of 7:30 on Channel 4, and a programme entitled "Play Live Football" scheduled at a start time of 7:30 on BBC 1. The lists 41–43 are compiled and periodically updated by the CPU 25 with reference to the EPG data received from EPG transport stream 31. The EPG screens also include a clock 44 indicating the current time (in this case 7:12).

FIG. 4 illustrates the setup data, real time data and status flag information broadcast during a forty-five minute period between 7:15 and 8:00. At 7:15 the CCS2 inserts a status flag 102 into the EPG S1 table which indicates that the setup data for the "Two Way Triv" scheduled interactive application will be available in five minutes. On receipt of this status flag, the STB causes the "Two Way TV" icon 45 to turn amber.

Ten minutes before the scheduled start time of the "Two Way Triv" program (ie. at 7:20), the CCS 2 downloads setup data relating to the "Two Way Triv" scheduled interactive application from the application data store 3, and feeds it to the broadcast headend multiplexer 4. The multiplexer 4 then places the data on the broadcast carousel whereby it repeatedly transmits the setup data on the transport stream 30 as indicated at 100 in FIG. 4. At the same time, the CCS inserts a status flag 103 in the EPG SI table in order to indicate that the "Two Way Triv" setup data is now available on the transport stream 30. On receipt of the status flag, the icon turns green as indicated at 45'. With the green icon 45' highlighted, the user can enter the game at 46 by pressing an OK button on the input device 33. The CPU 25 then generates a "splash screen" 47 using the splash screen information in the EPG transport stream 31.

The splash screen for the "Two Way Triv" programme starts with a "pay per play" routine 52 in which the user is first presented with a choice of prize play 48, free play 49 or cancel 50. If the free play icon 49 is selected the routine jumps to a copyright message (not shown) which is held on screen for a predetermined period. If the prize play icon 48 is selected, the-user is presented with the choice of paying using his play account 53, money card 54, or cancelling 55. If the user selects either of the payment icons, the splash screen sequence jumps to a payment routine 51 in which the user is prompted to enter his play account pin number, or money card (eg Mondex) pin number. The CPU 25 then implements a credit check routine and jumps to the copyright message.

During the time that the splash screen 47 is displayed, the CPU 25 switches the tuner 26 to receive data from transport stream 30 (frequency X). Setup data with the "Two Way Triv" PID is downloaded by CPU 25 and saved in the RAM 27. Once all of the setup data has been downloaded (or sufficient components of it to allow execution to commence) timed execution of the scheduled interactive application can commence.

At the scheduled start time of 7.30, the CCS 2 generates real time question data which is broadcast to the user interfaces as indicated at 101 in FIG. 4. At 7.30 the CPU 25 automatically enters a game mode in which the user is presented with a series of questions based on the received question data. The user provides answers by selecting answer icons.

In the case of the "Two Way Triv" game the questions and answers fill the entire CRT screen. In the case of "Star Quiz" the questions and answers are overlaid on a real-time television broadcast of a presenter reading out the questions to competitors in a television studio, originating from the Channel 4 broadcast TV station 9.

At the same time the CCS 2 inserts a status flag 104 in the EPG SI table in order to indicate that the real time data is now available along with the setup data. If the user has not yet entered the game, then on receipt of this status flag the "Two Way Triv" icon 45 starts flashing. This indicates that the user can still enter the game by highlighting the flashing icon 45 and pressing the OK button.

At 7:40 the setup data broadcast 100 ends, and the CCS 2 inserts a status flag 105 in the EPG SI table. On receipt of this status flag the "Two Way TRIV" icon 45 turns red and stops flashing. The user can no longer enter the game after 7:40.

At the end of the real time data broadcast 101 at 8:00, the CPU 25 transmits the user's score to the CCS 2 via the modem 34. The CCS2 also inserts a status flag 106 in the EPG SI table. On receipt of this status flag the "Two Way Triv" icon 45 is deleted from the screen.

Each user has an account with a number of cash credits which are stored and managed by the CCS 2. On receipt of scores from a number of user interfaces the CCS 2 compares the scores and issues prizes to the users with the highest scores by adding cash credits to their accounts.

What is claimed is:

1. A method of broadcasting a scheduled interactive application to a plurality of users via respective user interfaces, the method comprising:
    a) placing setup data on a broadcast carousel prior to a scheduled start time of the interactive application whereby setup data is repeatedly broadcast to the user interfaces prior to the scheduled start time;
    b) broadcasting real time data to the user interfaces at the scheduled start time; and
    c) broadcasting a status flag to the user interfaces, the status flag being indicative of the status of the setup data broadcast carried out in step a) or the real time data broadcast carried out in step b),
    wherein the status flag and setup data are broadcast at different broadcast frequencies.

2. A method according to claim 1 wherein step a) comprises broadcasting the setup data between a setup start time and a setup stop time, and wherein the status flag is indicative of the setup start time or the setup stop time.

3. A method according to claim 1, wherein step b) comprises broadcasting the real time data between a scheduled start time and a scheduled stop time, and wherein the status flag is indicative of the scheduled start time or the scheduled stop time.

4. A method according to claim 1, further comprising broadcasting electronic program guide (EPG) data to the user interfaces, the FPG data being indicative of the scheduled start time for the real time data broadcast.

5. A method according to claim 2, wherein step b) comprises broadcasting the real time data between a scheduled start time and a scheduled stop time, and wherein the status flag is indicative of the scheduled start time or the scheduled stop time.

6. A method according to claim 2, further comprising broadcasting electronic program guide (EPG) data to the user interfaces, the EPG data being indicative of the scheduled start time for the real time data broadcast.

7. A method according to claim 3, wherein the status flag and setup data are broadcast at different broadcast frequencies.

8. A method according to claim 7, further comprising broadcasting electronic programme guide (EPG) data to the user interfaces, the EPG data being. indicative of the scheduled start time for the real time data broadcast.

9. A method according to claim 8 wherein the status flag is broadcast at the same broadcast frequency as the EPG data.

10. A method according to claim 3, further comprising broadcasting electronic program guide (EPG) data to the user interfaces, the EPG data being indicative of the scheduled start time for the real time data broadcast.

11. Apparatus for broadcasting a scheduled interactive application to a plurality of users via respective user interfaces, the apparatus comprising:
    means for placing setup data on a broadcast carousel prior to a scheduled start time whereby setup data is repeatedly broadcast to the user interfaces;
    means for broadcasting real time data to the user interfaces at the scheduled start time, wherein the apparatus further comprises:
        means for broadcasting a status flag to the user interfaces, the status flag being indicative of the status of the setup data broadcast means or the real time data broadcast means,
        wherein the status flag and setup data are broadcast at different broadcast frequencies.

12. Apparatus according to claim 11 wherein the status flag is broadcast by a first transmitter at a respective first frequency, and the setup data is broadcast by a second transmitter at a respective different second frequency.

13. Apparatus according to claim 12 further comprising means for broadcasting electronic programme guide (EPG) data to the user interfaces, the EPG data specifying the scheduled start time of the real time data broadcast.

14. Apparatus according to claim 13 wherein the status flag and EPG data are multiplexed on a common frequency by a head end multiplexer.

15. A method of broadcasting a scheduled interactive application to a plurality of users via respective user interfaces, the method comprising:
    a) placing setup data on a broadcast carousel prior to a scheduled start time of the interactive application whereby setup data is repeatedly broadcast to the user interfaces prior to the scheduled start time;
    b) broadcasting real time data to the user interfaces at the scheduled start time; and
    c) broadcasting a status flag to the user interfaces indicative of the status of the setup data broadcast carried out in step a), wherein the status flag and setup data are broadcast at different broadcast frequencies.

16. A method of broadcasting a scheduled interactive application to a plurality of users via respective user interfaces, the method comprising:

a) placing setup data on a broadcast carousel prior to a scheduled start time of the interactive application whereby setup data is repeatedly broadcast to the user interfaces prior to the scheduled start time;

b) broadcasting real time data to the user interfaces at the scheduled start time; and c) broadcasting a status flag to the user interfaces indicative of the status of the setup data broadcast carried out in step a), wherein the status flag is broadcast separately from the setup data.

* * * * *